(12) United States Patent
Masaki et al.

(10) Patent No.: US 7,497,598 B2
(45) Date of Patent: Mar. 3, 2009

(54) LIGHT DIFFUSION FILM, SURFACE LIGHT SOURCE UNIT, AND LIQUID CRYSTAL DISPLAY

(75) Inventors: Tadahiro Masaki, Tokyo (JP); Fumihiro Arakawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 78 days.

(21) Appl. No.: 10/583,281

(22) PCT Filed: Dec. 28, 2004

(86) PCT No.: PCT/JP2004/019620

§ 371 (c)(1), (2), (4) Date: Jun. 16, 2006

(87) PCT Pub. No.: WO2005/066663

PCT Pub. Date: Jul. 21, 2005

(65) Prior Publication Data

US 2007/0177386 A1    Aug. 2, 2007

(30) Foreign Application Priority Data

Jan. 5, 2004    (JP) .............................. 2004-000125

(51) Int. Cl.
  *F21V 7/04*    (2006.01)
(52) U.S. Cl. .................... 362/330; 362/600; 362/618
(58) Field of Classification Search ................ 362/600, 362/634
See application file for complete search history.

(56) References Cited

U.S. PATENT DOCUMENTS

| | | | |
|---|---|---|---|
| 4,576,850 A | 3/1986 | Martens | |
| 6,117,919 A | 9/2000 | Oda et al. | |
| 6,787,202 B2 * | 9/2004 | Mizutani et al. | ........... 428/1.54 |

FOREIGN PATENT DOCUMENTS

| | | |
|---|---|---|
| JP | A 05-203939 | 8/1993 |
| JP | A 11-050009 | 2/1999 |
| JP | A 2001-021706 | 1/2001 |
| JP | A 2001-042108 | 2/2001 |
| JP | A 2001-159703 | 6/2001 |
| JP | B2 3233669 | 9/2001 |
| JP | A 2003-050306 | 2/2003 |
| JP | A 2003-248218 | 9/2003 |
| JP | A 2005-070253 | 3/2005 |
| WO | WO 03/038787 A1 | 5/2003 |

* cited by examiner

*Primary Examiner*—Anabel M Ton
(74) *Attorney, Agent, or Firm*—Oliff & Berridge PLC

(57) ABSTRACT

A light diffusion film 1 according to the present invention comprises a transparent substrate 11 and a light-diffusing layer 15 provided on the transparent substrate 11, and the light-diffusing layer 15 comprises an ionizing radiation curing resin and an ultraviolet light absorber and has, on its surface, fine irregularities 17 that have a function of diffusing light. The ultraviolet light absorber is one, or two or more compounds selected from benzotriazole ultraviolet light absorbers, salicylate ultraviolet light absorbers, and benzophenone ultraviolet light absorbers. The light-diffusing layer 15 does not contain any filler having a function of diffusing light but has, on its surface, fine irregularities 17 made by DPS (Drum Printing System).

12 Claims, 3 Drawing Sheets

LIGHT DIFFUSION FILM, SURFACE LIGHT SOURCE UNIT, AND LIQUID CRYSTAL DISPLAY

BACKGROUND OF THE INVENTION

1. Field of the Invention

The present invention relates to a light diffusion film having the function of absorbing ultraviolet light, and more particularly, to a light diffusion film for use in a surface light source unit for a liquid crystal display or the like, to a surface light source unit using the light diffusion film, and to a liquid crystal display using the surface light source unit.

2. Background Art

Since liquid crystals themselves do not emit light, liquid crystal displays for personal computers, word processors, liquid crystal televisions, and the like are illuminated from their rear by surface light source units (also referred to as backlight units). The surface light source units for uniformly illuminating the entire liquid crystal display screens are classified into the edge light type using a light guide plate and the direct type using fluorescent lamps arranged in parallel. In a surface light source unit of edge light type, light from a line light source enters a light guide plate from its edge face and emerges from the surface of the light guide plate via a light-scattering pattern provided on the back surface of the light guide plate. Thus, the line light source is converted into a surface light source. In the case of a surface light source unit of direct type, a plurality of line light sources are arranged right under a liquid crystal display to illuminate the liquid crystal display screen. Such a surface light source unit comprises a light diffusion film, a lens film, a protective light diffusion film, etc. to let the light from the light source emerge from the plane of emergence, to diffuse or converge the emerging light, and to make the luminance on the illuminated surface uniform.

In recent years, liquid crystal displays have been made large in screen size and have come to be used for televisions (TVs), and so forth. Although the luminance of images displayed on conventional small screens has not been a significant matter, TVs are required to attain high luminance and wide viewing angles because many people watch a TV at the same time in a relatively brightly lighted room. Therefore, a direct-type surface light source unit using, as a light source, a plurality of fluorescent lamps with high output is mainly used for a liquid crystal display for a TV.

However, when the output of this light source is increased, radiation of unwanted ultraviolet light increases along with radiation of visible light. Consequently, optical members, such as a light diffusion film, a lens film, and a polarizer film, contained in the surface light source unit undergo deterioration by the ultraviolet light and are colored or cracked. A possible way to avoid such deterioration, of course, is to add ultraviolet light absorbers to the lens film, the polarizer film, and so on. However, the optical films such as the polarizer film and the lens film are required to have the desired optical parameters such as polarization characteristics and refractive index, so that the addition of impurities such as ultraviolet light absorbers has been detrimental and also laborious. Further, the addition of ultraviolet light absorbers to resins such as acrylic resins that are usually used for the optical films has also been disadvantageous in that the ultraviolet light absorbers bleed off from the resins with time, which leads to decrease in the amount of the ultraviolet light absorbers, and that the ultraviolet light absorbers that have bled off the resins are crystallized to make the resins cloudy.

PRIOR ART

Light diffusion films that comprise ultraviolet light absorbers incorporated in light-diffusing layers or substrates themselves have so far been known as light diffusion films for use in surface light source units of edge light type (see Patent Documents 1 to 3, for example). All of these Patent Documents describe surface light source units of edge light type and merely mention that ultraviolet light absorbers may be added as additives. Unlike the present invention, they neither describe nor suggest, while paying attention to the effects of specific ultraviolet light absorbers, light diffusion films useful for direct-type surface light source units having light sources that emit powerful ultraviolet light.

Further, Patent Document 2, which the inventors of the present invention applied for patent, relates to matte films that are used to prevent sticking to polarized-light separators. This document neither describes nor suggests the light diffusion film of the present invention for use in a backlight unit that is used for a large-screen TV and has powerful light sources to be situated right under the TV screen.

Patent Document 1: Japanese Laid-Open Patent Publication No. 21706/2001,

Patent Document 2: Japanese Laid-Open Patent Publication No. 42108/2001, and

Patent Document 3: Japanese Laid-Open Patent Publication No. 50306/2003.

DISCLOSURE OF THE INVENTION

The present invention was accomplished in order to solve the aforementioned problems in the prior art. An object of the present invention is to provide a light diffusion film that is scarcely colored, remains highly transparent, can maintain its optical properties for a prolonged period of time, provides excellent display performance, shows high environmental reliability, does not affect the refractive index (light-focusing properties) of a lens film and the polarization characteristics of a polarizer film, and scarcely undergoes bleeding of an ultraviolet light absorber even if irradiated with powerful ultraviolet light when the light diffusion film is used in a surface light source unit that can attain high luminance but whose output of both visible light and ultraviolet light is high and this surface light source unit is incorporated in a liquid crystal display for a TV or the like; a surface light source unit; and a liquid crystal display.

The present invention is a light diffusion film comprising a transparent substrate and a light-diffusing layer provided at least on one surface of the transparent substrate either directly or through another layer, the light-diffusing layer comprising an ionizing radiation curing resin and an ultraviolet light absorber and having, on its surface, fine irregularities that have a function of diffusing light.

The present invention is the light diffusion film, in which light-diffusing layers are provided on both surfaces of the transparent substrate, each light-diffusing layer comprising an ionizing radiation curing resin and an ultraviolet light absorber and having, on its surface, fine irregularities that have a function of diffusing light.

The present invention is the light diffusion film, in which the light-diffusing layer is provided at least on one surface of the transparent substrate through a primer layer.

The present invention is the light diffusion film, in which the ultraviolet light absorber is one, or two or more compounds selected from benzotriazole ultraviolet light absorbers, salicylate ultraviolet light absorbers, and benzophenone ultraviolet light absorbers.

The present invention is the light diffusion film, in which the ultraviolet light absorber further contains a hindered amine radical scavenger.

The present invention is the light diffusion film that, when being incorporated in a 21-type (21-inch) surface light source unit having a direct-type surface light source member that contains, as a light source, 12 cold cathode ray tubes arranged in parallel, makes the center portion of the surface of the surface light source unit show a change in hue (b*), based on the L*, a*, b* color system according to Japanese Industrial Standard Z-8729 (hereinafter JIS-Z-8729) of not more than 2.0 as a difference between the hue values determined right after the incorporation of the light diffusion film to the surface light source unit and after 5000-hour lighting of the light source.

The present invention is a surface light source unit comprising a direct-type surface light source member containing a plurality of light sources that are arranged in parallel and a reflector surrounding these light sources, having an opening on the light-emerging side and a light-reflecting face on its inner surface; a light diffusion film placed on the light-emerging side of the direct-type surface light source member; and a lens film placed on the light-emerging side of the light diffusion film, said light diffusion film comprising a transparent substrate and a light-diffusing layer provided at least on one surface of the transparent substrate either directly or through another layer, the light-diffusing layer comprising an ionizing radiation curing resin and an ultraviolet light absorber and having, on its surface, fine irregularities that have the function of diffusing light.

The present invention is the surface light source unit, in which light-diffusing layers are provided on both surfaces of the transparent substrate, and each light-diffusing layer comprises an ionizing radiation curing resin and an ultraviolet light absorber and has, on its surface, fine irregularities that have a function of diffusing light.

The present invention is the surface light source unit, in which the ultraviolet light absorber is one, or two or more compounds selected from benzotriazole ultraviolet light absorbers, salicylate ultraviolet light absorbers, and benzophenone ultraviolet light absorbers.

The present invention is the surface light source unit, in which the ultraviolet light absorber further contains a hindered amine radical scavenger.

The present invention is the surface light source unit, in which the light-diffusing layer is provided at least on one surface of the transparent layer through a primer layer.

The present invention is the surface light source unit, in which the direct-type surface light source member contains, as a light source, 12 cold cathode ray tubes that are arranged in parallel, the surface light source unit is of 21 type (21 inches), and the center portion of the surface of the surface light source unit shows a change in hue (b*), based on the L*, a*, b* color system according to JIS-Z-8729, of not more than 2.0 as a difference between the hue values determined right after the incorporation of the light diffusion film in the surface light source unit and after 5000-hour lighting of the light source.

The present invention is a liquid crystal display comprising a surface light source unit and a liquid crystal display panel placed on the light-emerging side of the surface light source unit, the surface light source unit comprising a direct-type surface light source member containing a plurality of light sources that are arranged in parallel and a reflector surrounding these light sources, having an opening on the light-emerging side and a light-reflecting face on its inner surface; a light diffusion film placed on the light-emerging side of the direct-type surface light source member; and a lens film placed on the light-emerging side of the light diffusion film, said light diffusion film comprising a transparent substrate and a light-diffusing layer provided at least on one surface of the transparent substrate either directly or through another layer, the light-diffusing layer comprising an ionizing radiation curing resin and an ultraviolet light absorber and having, on its surface, fine irregularities that have the function of diffusing light.

The present invention provides a light diffusion film that is scarcely colored, has high transparency, can maintain its optical properties for a prolonged period of time, provides excellent image performance, and shows high environmental reliability.

The present invention provides a surface light source unit that is scarcely colored, remains highly transparent, and can maintain its optical properties for a prolonged period of time even when used in a large-screen display, for a TV or the like, of direct type having a plurality of light sources.

The present invention provides a high-luminance liquid crystal display for a TV or the like, which many people can watch at the same time in a relatively brightly lighted room.

BEST MODE FOR CARRYING OUT THE INVENTION (Basic Construction)

Embodiments of the present invention will be described hereinafter with reference to the accompanying drawings.

Figure 1:
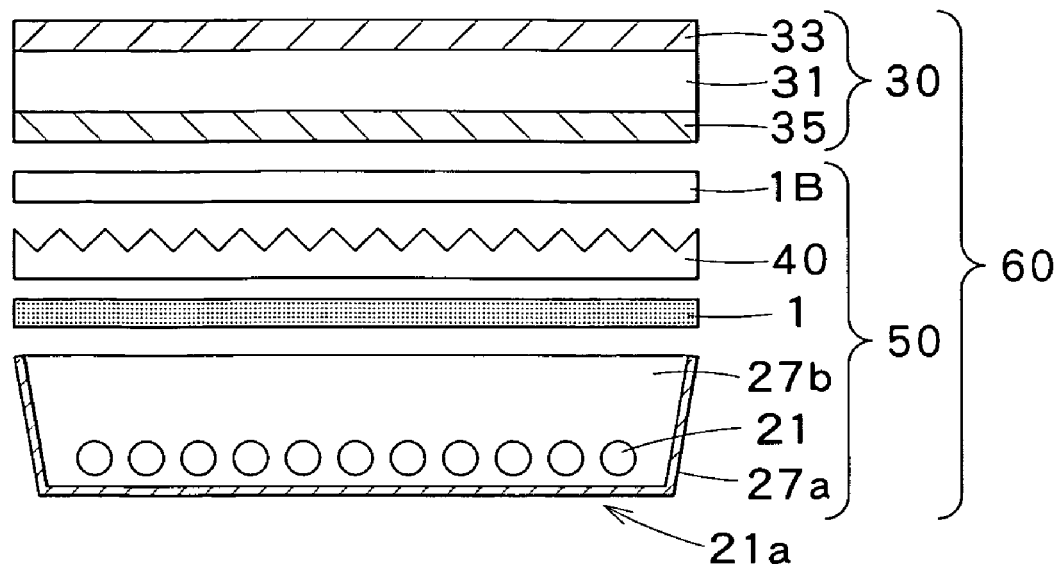
FIG. 1 is a view showing a surface light source unit and a liquid crystal display according to the present invention.
Figure 2:
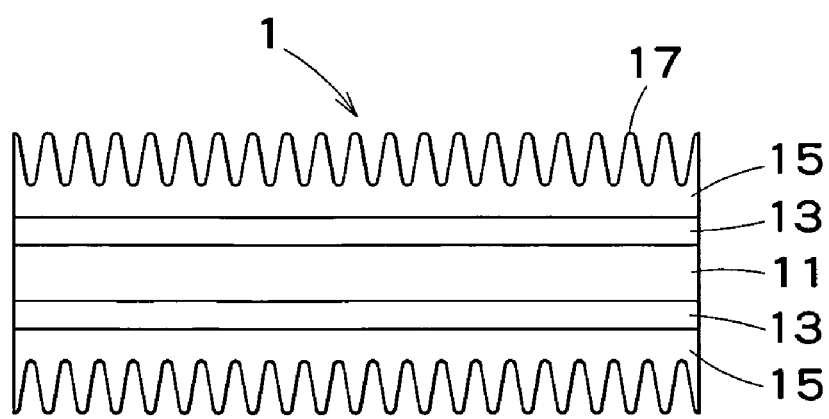
FIG. 2 is a sectional view of a light diffusion film according to the present invention.

FIG. 1 shows a surface light source unit and a liquid crystal display according to the present invention, and FIG. 2 shows a light diffusion film according to the present invention.

As shown in FIGS. 1 and 2, a liquid crystal display 60 comprises a surface light source unit 50, and a liquid crystal display panel 30 placed on the light-emerging side of the surface light source unit 50.

The surface light source unit 50 comprises a plurality of light sources 21 that are cold cathode ray tubes or the like and are arranged in parallel, a reflector 27 that surrounds the bottoms (opposite to the liquid crystal display panel) and the sides of the light sources 21 and has an opening 27b on the light-emerging side (the liquid crystal display panel side), a light diffusion film 1 placed on the light-emerging side (the opening 27b side) of the reflector 27, a lens film 40 placed on the light-emerging side of the light diffusion film 1, and a protective light diffusion film 1B optionally placed on the light-emerging side of the lens film 40.

A plurality of the light sources 21 and the reflector 27 compose a direct-type surface light source member 21a.

In the direct-type surface light source member 21a, the reflector 27 has a light-reflecting face 27a on its inner surface, and this light-reflecting face 27a returns, to the opening 27b side, light that has emerged from the light sources 21 and traveled toward the bottoms and the sides of the light sources

21. All of the light from the light sources 21 is thus allowed to emerge from the opening 27b of the reflector 27 toward the liquid crystal display panel 30 side.

The liquid crystal display panel 30, placed on the light-emerging side of the surface light source unit 50, comprises a lower substrate 35, an upper substrate 33, and a liquid crystal layer 31 sandwiched between the lower substrate 35 and the upper substrate 33. The surface light source unit 50 serves as a backlight unit for illuminating the liquid crystal display panel 30 from its rear.

The light diffusion film 1 of the present invention, its embodiment shown in FIG. 2, comprises a transparent substrate 11 and light-diffusing layers 15 provided on both surfaces of the transparent substrate 11 through primer layers 13, and the light-diffusing layers 15 have, on their surfaces, fine irregularities 17 that have a function of diffusing light. Each light-diffusing layer 15 comprises an ionizing radiation curing resin composition and an ultraviolet light absorber contained in the ionizing radiation curing resin composition, and has been irradiated with ionizing radiation to be a cured layer. Although the light diffusion film 1 shown in FIG. 2 comprises the light-diffusing layers 15 provided on both surfaces of the transparent substrate 11, the light-diffusing layer 15 may be provided only on one surface of the transparent substrate 11. Even when the ultraviolet light absorbing power is enhanced by increasing the thickness of the light-diffusing layer 15, the light diffusion film 1 comprising the light-diffusing layers 15 provided on both surfaces of the transparent substrate 11 scarcely undergoes warping or sagging that is usually caused by the difference in the degree of swelling-shrinkage between the transparent substrate 11 and the light-diffusing layer 15, as compared with the light diffusion film 1 comprising the light-diffusing layer 15 provided only on one surface of the transparent substrate 11. Further, although the light diffusion film 1 shown in FIG. 2 comprises the primer layer 13 between the transparent substrate 11 and each light-diffusing layer 15, the primer layer 13 can be omitted if the substrate 11 and the light-diffusing layer 15 adhere to each other with sufficiently high strength. Furthermore, the light diffusion film 1 of the present invention contains substantially no light-diffusing agent, and makes use of the light-diffusing effect of the irregularities made on the surfaces of the light-diffusing layers 15. Therefore, when an ultraviolet light absorber is incorporated in the light-diffusing layer, it never affects the light-diffusing power.

(Transparent Substrate)

Various materials such as transparent resins can be used for the transparent substrate 11 as long as they have transparency, insulating properties, heat resistance, mechanical strength, and so on that are high enough to withstand service conditions and production. A sheet, a film, a board, or the like of any of transparent resins including polyester resins such as polyethylene terephthalate, polybutylene terephthalate, polyethylene naphthalate, terephthalic acid—isophthalic acid—ethylene glycol copolymers, and terephthalic acid—cyclohexane dimethanol—ethylene glycol copolymers, polyamide resins such as nylon 6, polyolefin resins such as polypropylene and polymethyl pentene, acrylic resins such as polymethyl (meth) acrylate, ABS resins, styrene resins such as polystyrene and styrene—acrylonitrile copolymers, cellulose resins such as triacetyl cellulose, imide resins, and polycarbonate resins can be used as the transparent substrate 11.

The transparent-resin-made transparent substrate 11 may also be made from a copolymer resin or a mixture (including an alloy) whose main components are resins selected from the above-enumerated ones, or may be a laminate of two or more layers of the resins. Although the transparent substrate may be either an oriented or non-oriented film, a mono- or bi-axially oriented film is preferred from the viewpoint of improvement in strength. When the transparent substrate is made from the transparent resin, the thickness of the transparent substrate is usually from 12 to 1000 μm, preferably from 50 to 700 μm, and most preferably from 100 to 500 μm. A transparent substrate with a thickness of less than the above range cannot have sufficiently high mechanical strength and therefore unfavorably warps, sags, or ruptures. On the other hand, a transparent substrate with a thickness of more than the above-described range has excessively high strength, which is wasteful also from the viewpoint of cost.

Films of polyester resins such as polyethylene terephthalate and polyethylene naphthalate are usually conveniently used for the transparent substrate because they are excellent in transparency and heat resistance and are inexpensive, and bi-axially oriented polyethylene terephthalate films are most preferred because they are not easily broken, are light in weight, and can be shaped with ease. The higher is the transparency of the substrate, the better. Preferably, the transparent substrate has a transmittance of 80% or more for visible light.

Prior to the formation of the light-diffusing layer, the surface of the transparent substrate on which the light-diffusing layer will be formed may be subjected to adhesion-improving treatment. Typical adhesion-improving treatment is a primer (also referred to as anchoring agent, adhesion-promoting agent, or adhesion-improving agent) coating treatment. Other useful treatments include corona discharge treatment, plasma treatment, ozone treatment, flame treatment, preheating, dust removing, vacuum deposition, and alkali treatment. Additives such as fillers, plasticizers, and antistatic agents may be incorporated in the transparent substrate, as needed. If necessary, ultraviolet light absorbers may be incorporated also in the transparent substrate.

The case where primer layers 13 are provided on both surfaces of the transparent substrate 11 is shown in FIG. 2.

(Light-Diffusing Layer)

The light-diffusing layer 15 has, on its surface, fine irregularities 17 and has proper light-diffusing power. Further, the light-diffusing layer 15 is a cured layer obtained by curing, with ionizing radiation, a known ionizing radiation curing resin composition in which an ultraviolet light absorber has been dissolved or dispersed. Basically, the light-diffusing layer 15 contains no light-diffusing agent such as silica particles or resin beads.

(Ionizing Radiation Curing Resin Composition)

A known composition consisting of a monomer such as (meth)acrylate (acrylate and methacrylate will be hereinafter collectively written as (meth)acrylate) of a polyfunctional compound such as a polyhydric alcohol, or an oligomer (or prepolymer) of such a monomer, a photopolymerization initiator, a photosensitizer, and so forth can be used as the ionizing radiation curing resin composition.

In the case where an electron beam is used as ionizing radiation, it is not necessary to use the photopolymerization initiator and the photosensitizer.

An ultraviolet light absorber is dissolved or dispersed in the ionizing radiation curing resin composition. This resin composition is irradiated with ionizing radiation in order to cure the resin composition while making the fine irregularities 17 on the resin composition.

It is preferable to use, as the above-described monomer or oligomer (or prepolymer), at least one tri- or more functional compound in order to obtain a cured layer having a three-dimensionally cross-linked molecular structure. By this, it is possible to prevent bleeding of the ultraviolet light absorber with time, and, moreover, the light-diffusing layer can have enhanced scratch resistance. Examples of tri- or more functional monomers include trimethylol propane tri(meth)acrylate, pentaerythritol hexa(meth)acrylate, dipentaerythritol hexa(meth)acrylate, pentaerythritol penta(meth)acrylate, dipentaerythritol penta(meth)acrylate, and dipentaerythritol hexa(meth)acrylate, and examples of tri- or more functional prepolymers include tri- or more functional polyester (meth) acrylate, urethane (meth)acrylate, and epoxy(meth)acrylate.

Examples of monofunctional monomers include ethyl (meth)acrylate, ethylhexyl (meth)acrylate, styrene, and N-vinylpyrrolidone. Examples of functional monomers include tripropylene glycol di(meth)acrylate, neopentyl glycol di(meth)acrylate, and diethylene glycol di(meth)acrylate.

The above-described photopolymerization initiator includes acetophenone and benzophenone photopolymerization initiators, and the photosensitizer includes n-butylamine, triethylamine, and tri-n-butylphosphine. The two agents are mixed before use.

The light-diffusing layer 15 is formed by the use of the above-described materials. The light-diffusing layer 15 is a cured layer obtained by curing the above-described ionizing radiation curing resin composition in which an ultraviolet light absorber has been incorporated, and has the resistance to ultraviolet light due to the ultraviolet light absorbing power of the ultraviolet light absorber. Thanks to the resistance to ultraviolet light, even when irradiated with ultraviolet light, the light-diffusing layer 15 is scarcely colored, remains highly transparent, can maintain its optical properties for a prolonged period of time, provides excellent display performance, and shows high environmental reliability.

Especially when an ultraviolet light absorber is added to an ionizing radiation curing resin having a polymeric structure which a monomer, prepolymer, or the like is three-dimensionally cross-linked, there can be obtained a light-diffusing layer 15 from which the ultraviolet light absorber never bleeds off owing to the three-dimensionally cross-linked structure of the polymer.

A change in hue due to coloring is indicated by the hue b* (b star value) based on the L*, a*, b* color system according to JIS-Z-8729. The light diffusion film of the present invention is incorporated in a 21-type (diagonal line length: 21 inches) surface light source unit containing, as a light source, 12 cold cathode ray tubes that are arranged in parallel, and the hue in the center portion of the surface of the surface light source unit is measured right after the incorporation of the light diffusion film to the surface light source unit and after 5000-hour lighting of the light source. It is necessary that the change in hue (b*) thus determined be 2.0 or less, preferably 1.0 or less. A change in hue of more than 2.0 means that coloring has occurred to a great extent, and such coloring adversely affects transparency and color purity. When the change in hue (b*) is 2.0 or less, the influence of coloring is small, and when the change in hue (b*) is 1.0 or less, no coloring is practically observed. The relationship between the b* value and the type of the ultraviolet light absorber will be described in detail in Examples.

(Ultraviolet Light Absorber)

Any ultraviolet light absorber can be used herein, and useful ones include benzotriazole, salicylate, benzophenone, cyanoacrylate, and triaryltriazine ultraviolet light absorbers. Such an ultraviolet light absorber has the effect of preventing coloring of the light-diffusing layer. Preferably, a hindered amine radical scavenger is used in addition to the ultraviolet light absorber. Although hindered amine radical scavengers have substantially no effect of absorbing ultraviolet light, they inhibit deterioration reactions of resins that are induced by ultraviolet light. Therefore, even by the addition of only a hindered amine radical scavenger to the light-diffusing layer 15, it is possible to prevent deterioration of the light diffusion film, such as coloring of the light diffusion film itself that is caused by the output light of the surface light source. However, the hindered amine radical scavenger is poor in the ability to prevent the other members such as the lens film 40 that are mounted on the light diffusion film 1 from undergoing deterioration by ultraviolet light. For this reason, incorporation of an ultraviolet light absorber to the light-diffusing layer 15 is essentially needed not only to prevent the light diffusion film 1 itself from undergoing deterioration by ultraviolet light but also to prevent the other members, situated on the light diffusion film 1, from undergoing deterioration by ultraviolet light.

Examples of hindered amine radical scavengers useful herein include hindered amine compounds such as 2,2,6,6-tetramethyl-4-piperidylstearate, 1,2,2,6,6-pentamethyl-4-piperidylstearate, 2,2,6,6-tetramethyl-4-piperidylbenzoate, bis(2,2,6,6-tetramethyl-4-piperidyl)-sebacate, bis(1,2,2,6,6-tetramethyl-4-piperidyl)sebacate, bis(1-octoxy-2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)di(tridecyl)-1,2,3,4-butanetetracarboxylate, bis(1,2,2,6,6-penta-methyl-4-piperidyl)di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidynol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)-hexane/2,4-dichloro-6-tert-octylamino-s-triazine polycondensate, 1,5,8,12-tetrakis[2,4-bis(N-butyl-N-(2,2,6,6-tetramethyl-4-piperidyl)-amino )-s-triazine-6-yl]-1,5,8,12-tetrazadodecane, 1,5,8,12-tetrakis[2,4-bis(N-butyl-N-(1,2,2,6,6-pentamethyl-4-piperidyl)amino)-s-triazine-6-yl]-1,5,8,12-tetrazadodecane, 1,6,11-tris[2,4-bis(N-butyl-N-(2,2,6,6-tetramethyl-4-piperidyl)amino)-s-triazine-6-yl]aminoundecane, and 1,6,11-tris[2,4-bis(N-butyl-N-(1,2,2,6,6-pentamethyl-4-piperidyl)amino)-s-triazine-6-yl]aminoundecane.

Examples of benzotriazole ultraviolet light absorbers include 2-(2'-hydroxy-5'-methylphenyl)benzotriazole, 2-(2'-hydroxy-3',5'-di-tert-butylphenyl)-5-chlorobenzotriazole, 2-(2'-hydroxy-3'-tert-butyl-5'-methyl-phenyl)-5-chlorobenzotriazole, 2-(2'-hydroxy-5'-tert-octylphenyl)benzo-triazole, 2-(2'-hydroxy-3',5'-dicumylphenyl)benzotriazole, 2,2'-methylene-bis(4-tert-octyl-6-(benzotriazolyl)phenol), and 2-(2'-hydroxy-3'-tert-butyl-5'-carboxyphenyl )benzotriazole.

Preferred benzotriazole ultraviolet light absorbers are 2-(5'-methyl-2'-hydroxyphenyl)benzotriazole and 2-[2'-hydroxy-3',5'-bis(α,α-dimethylbenzyl)phenyl]benzotriazole.

Examples of salicylate ultraviolet light absorbers include phenyl salicylate; benzoates such as resorcinol monobenzoate, 2,4-di-tert-butyl phenyl-3,5-di-tert-butyl-4-hydroxybenzoate, 2,4-di-tert-amylphenyl-3,5-di-tert-butyl-4-hydroxybenzoate, and hexadecyl-3,5-di-tert-butyl-4-hydroxybenzoate; and 2-ethyl-2'-ethoxyoxanilide and 2-ethoxy-4'-dodecyloxanilide.

Examples of benzophenone ultraviolet light absorbers include 2-hydroxy-4-methoxybenzophenone, 2,2'-dihyroxy-4-methoxybenzo-phenone, 2-hydroxy-4-n-octyloxybenzophenone, 2,2'-dihydroxy-4-methoxybenzophenone, 2,4- dihydroxybenzophenone, 2-hydroxy-4-octoxybenzophenone, and 5,5'-methylenebis(2-hydroxy-4-methoxy-benzophenone).

Examples of cyanoacrylate ultraviolet light absorbers include ethyl-α-cyano-β,β-diphenylacrylate and methyl-2-cyano-3-methyl-3-(p-methoxyphenyl)acrylate.

Examples of triaryltriazine ultraviolet light absorbers include 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-di-tert-butylphenyl)-s-triazine.

Benzotriazole, salicylate, or benzophenone ultraviolet light absorbers are preferred from the viewpoints of general-purpose properties, handling properties, cost, ultraviolet light absorbing properties, and so on. Combination use of these ultraviolet light absorbers and the hindered amine radical scavengers is more preferred because it can impart the resistance to ultraviolet light to the light-diffusing layer 15. The amount of the ultraviolet light absorber to be added is from 0.001 to 10 parts by weight, preferably from 0.05 to 3 parts by weight, for 100 parts by weight of the ionizing radiation curing resin. When the amount of the ultraviolet light absorber added is less than the above-described range, the ultraviolet light absorbing power cannot be fully obtained, and the light-diffusing layer 15 is poor in the resistance to ultraviolet light. When this amount is more than the above-described range, the ultraviolet light absorber is not fully dissolved in the resin, and the mixture becomes turbid to have decreased transparency. Moreover, the cost is increased. For this reason, the amount of the ultraviolet light absorber to be added has to be properly selected from the above-described range. In the case where ultraviolet light is used as ionizing radiation, it is necessary to prevent, as much as possible, the ultraviolet light that is used to cure the ionizing radiation curing resin from being absorbed by the ultraviolet light absorber. It is therefore preferable to select a combination of ultraviolet light absorbers and ionizing radiation curing resins so that the absorption wave range of the ultraviolet light absorber to be added does not overlap the whole wave range of ultraviolet light that is needed for curing.

(Production Process)

A process of producing the light diffusion film of the present invention will be described hereinafter.

Figure 3:
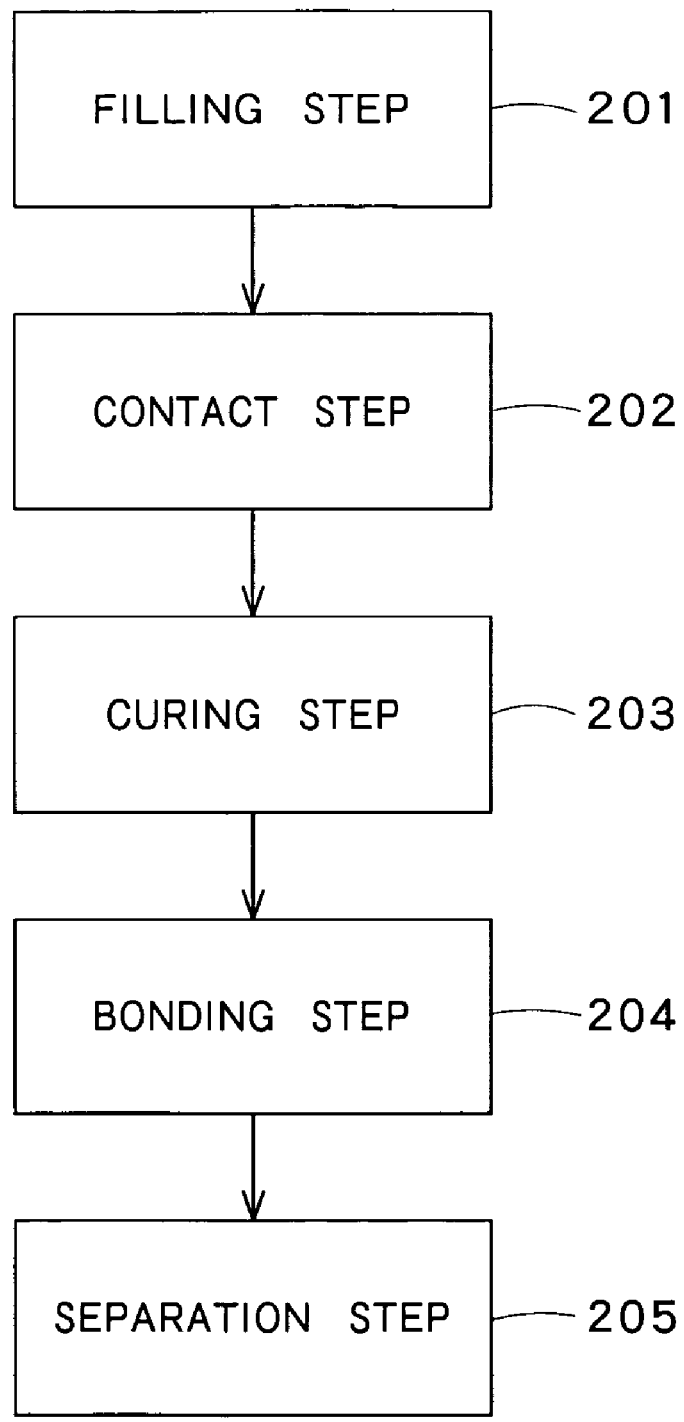
FIG. 3 is a flow chart of a process of producing a light diffusion film according to the present invention.

FIG. 3 is a flow chart of the production process, showing an embodiment of the present invention.

Figure 4:
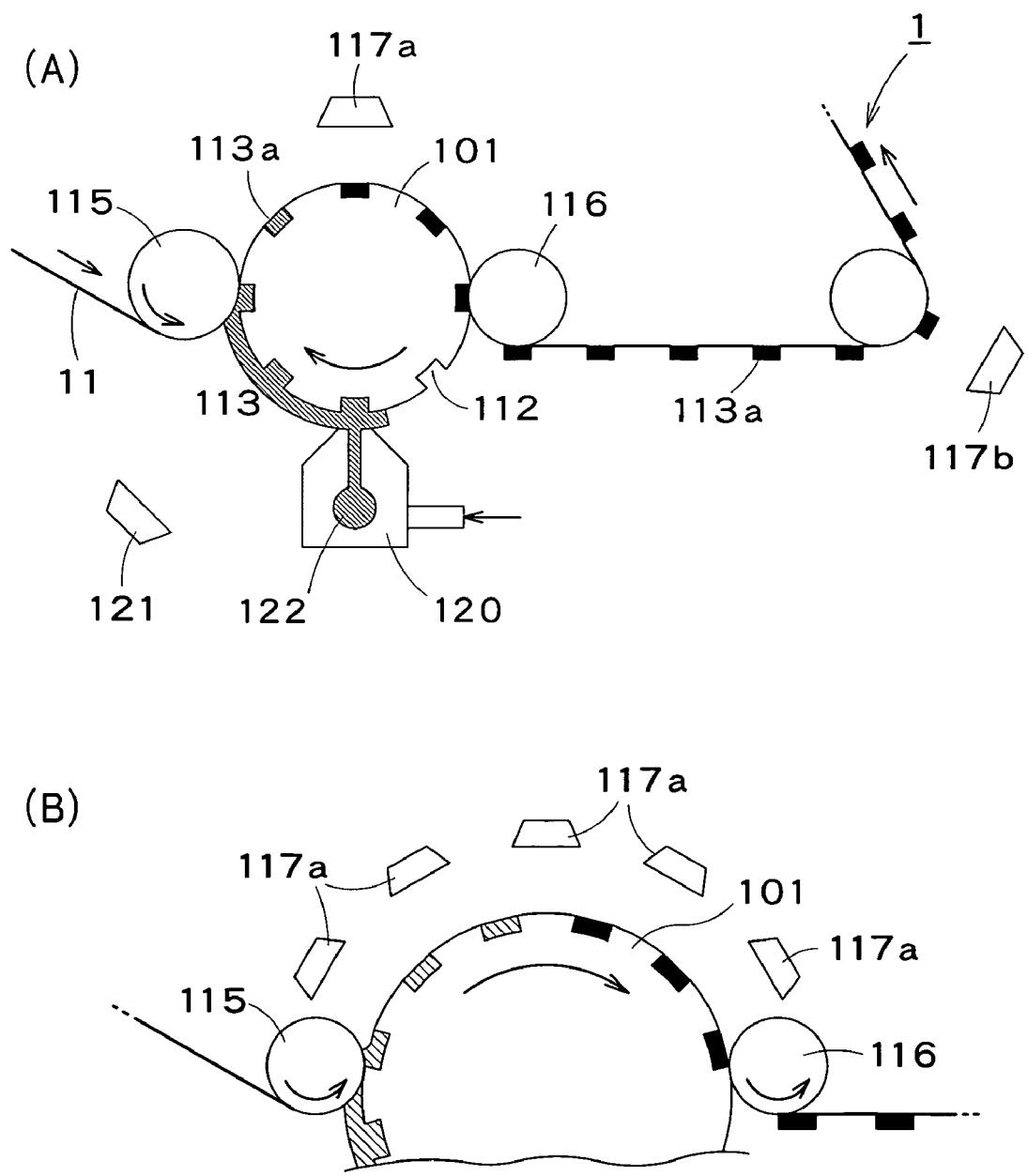
FIG. 4 is a view showing a production system that is used for producing a light diffusion film according to the present invention.

FIG. 4 is a diagrammatic sectional view of a part of a production system that is used for the production of a light diffusion film, showing an embodiment of the present invention.

A known process (those skilled in the art call DPS (drum printing system)) as is shown in FIG. 3, described in Japanese Patent Publication No. 3233669, the specification of U.S. Pat. No. 4,576,850, and so forth, can be employed to produce the light diffusion film of the present invention. This process consists of (a) the filling step 201, (b) the contact step 202, (c) the curing step 203, (d) the bonding step 204, and (e) the separation step 205.

(a) The filling step 201 is as follows: while rotating a roll intaglio 101 having embossed light-diffusive fine irregularities, at least the depressed parts 112 of the roll intaglio 101 are filled with an ionizing radiation curing resin liquid 113. (b) The contact step 202 is as follows: a transparent substrate 11 that is running in the direction of rotation of the roll intaglio 101 in synchronism with the rotation of the roll intaglio 101 is brought into contact with the ionizing radiation curing resin liquid 113 with which the depressed parts of the roll intaglio 101 have been filled in the filling step 201. (c) The curing step 103 is as follows: while the transparent substrate 11 and the roll intaglio 101 are still in contact, ionizing radiation from a curing unit 117a is applied to the ionizing radiation curing resin liquid 113 present between the roll intaglio 101 and the transparent substrate 11, thereby forming a cured layer 113a. In this curing step 203, the cured layer 113a is shaped into fine irregularities by the roll intaglio 101 having the depressed parts 112. (d) The bonding step 204 is the step of firmly bonding, to the substrate layer 11, the ionizing radiation curing resin liquid 113 that is cured in the curing step 203. The curing step 203 and the bonding step 204 are usually effected simultaneously. (e) The separation step 205 is as follows: the cured layer 113a of the ionizing radiation curing resin liquid 113, on which the fine irregularities have been made in the curing step 203 and which has been firmly bonded to the transparent substrate 11 in the bonding step, that is, the ionizing-radiation-cured resin and the transparent substrate 11, are separated from the roll intaglio 101. The filling step 201 is carried out, for example, by the use of a die 120 having a cavity 122 as is shown in FIG. 4(A), or by direct application to the surface of the roll intaglio 101 with an application roll. Although the depressed parts 112 of the roll intaglio 101 are depicted in the figure as large rectangles for convenience' sake, they are actually fine irregularities in the present invention.

In FIG. 4(A), the ionizing radiation curing resin liquid 113 fed to the roll intaglio 101 from the die 120 is dried by a solvent evaporator 121, and is then cured by ionizing radiation from a curing unit 117a. The cured layer 113a of the ionizing radiation curing resin liquid, formed on the transparent substrate 11, is further cured by ionizing radiation from a curing unit 117b.

Alternatively, a plurality of curing units 117a may be arranged above the roll intaglio 101, as shown in FIG. 4(B), and the ionizing radiation curing resin liquid is successively cured with these curing units 117a.

Thus, there is obtained a light diffusion film 1 comprising the transparent substrate 11 and the light-diffusing layer 15 having the fine irregularities 17 on its surface, provided on the transparent substrate 11.

(Irregularities)

To make fine irregularities on the light-diffusing layer 15, irregularities that are the mirror image of the fine irregularities are made in advance on the surface of a roll intaglio, and the light-diffusing layer is produced by the above-described DPS, using this roll intaglio. Conventional sandblasting or etching can be employed to make the irregularities on the surface of a roll intaglio. In sandblasting, blasting treatment is conducted while spraying an abrasive on the outer surface of a roll intaglio. For the abrasive, particles with a mean particle diameter of approximately 1 to 100 µm, such as particles of silicon carbide, alundum, corundum, alumina, chromium oxide, zirconium oxide, or garnet; ceramic beads of white molten alumina, green silicon carbide, or white zircon; or glass beads may be used. The fine irregularities are made so that the surface with the fine irregularities has a surface roughness Rz according to JIS-B-0601 of 0.5 to 20.0.

Ionizing radiation means those electromagnetic waves or charged particle beams that have energy quanta high enough to polymerize or cross-link molecules. Ultraviolet light, electron beams, or the like is usually used as the ionizing radiation. In the case where ultraviolet light is used, such a light source as an extra-high pressure mercury vapor lamp, a high pressure mercury vapor lamp, a low pressure mercury vapor lamp, a carbon arc lamp, a black light lamp, or a metal halide lamp that emits radiation spectrum containing ultraviolet light with wavelengths of at least a part of the ultraviolet region of 190 to 380 nm may be used as the curing unit 117.

In the case where an electron beam is used, a unit provided with a radiation source selected from a variety of electron accelerators such as Cockcroft-Walton accelerator, Van de Graaff accelerator, resonant transformers, insulating-core transformers, linear electron accelerators, dynamitron, and high-frequency electron accelerators may be used as the curing unit 117. Using such a unit, an electron beam with energy of from 50 to 1000 keV, preferably from 70 to 300 keV, is applied. Preferably, the amount of the electron beam to be applied is usually about 0.5 to 30 Mrad.

(Surface Light Source Unit)

As shown in FIG. 1, a surface light source unit 50 of the present invention comprises a light source 21, a reflector 27 that reflects light from the light source 21 in a predetermined direction to attain surface illumination a light diffusion film 1, a lens film 40 (lenses are dimensionally exaggerated in the figure), and other optional optical films, as mentioned previously. The light diffusion film 1 is placed right above the opening 27*b* of the reflector 27, the position the light from the light source 21 firstly reaches. The other optical films such as the lens film 40, and a liquid crystal display panel 30 are placed above the light diffusion film 1, and, visible light, that is, the light from the light source 21 from which ultraviolet light has been removed, is allowed to enter the liquid crystal display panel 30. The surface light source unit 50 is characterized in that an ultraviolet light absorber is incorporated in the light diffusion film 1. For the light source 21, a plurality of light sources is usually used in order to obtain luminance high enough to display an image. For example, when the screen is of 21-inch (diagonal line length) type, approximately 12 cold cathode ray tubes are used for the light source 21. Further, in the surface light source unit 50 of the present invention, ultraviolet light contained in the light from the light source 21 is absorbed and removed by the light diffusion film 1 by which the light from the light source 21 is firstly received. It is therefore not necessary to add an ultraviolet light absorber to the other optical films such as the lens film 41 and a polarizer film that are placed above the light diffusion film 1, and the optical properties of these optical films therefore remain intact.

(Liquid Crystal Display)

As shown in FIG. 1, a liquid crystal display 60 of the present invention comprises a liquid crystal display panel 30 that is placed on the light-emerging side of the surface light source unit 50 of the present invention. The liquid crystal display 60 may be of any of various conventional modes and may be either monochrome or in color (full color). Further, the liquid crystal display 60 is applicable to displays that are used for clocks, electronic calculators, a variety of measuring instruments, word processors, etc. to indicate numbers and characters, and to displays that are used for televisions, output monitors of computers, etc. to display images. Of these, TVs with large screens and monitors that are used in public spaces as billboards or the like, which are the type that contains a direct-type surface light source composed of a plurality of powerful light sources, are preferred.

EXAMPLES

The present invention will be described hereinafter more specifically by way of the following Examples and Comparative Examples. However, the present invention is not limited to these Examples.

Example 1

A biaxially oriented, transparent polyethylene terephthalate (hereinafter abbreviated to PET) film with a thickness of 188 μm, "A 4300" (trademark, a PET film manufactured by Toyobo Co., Ltd., Japan), was used as the transparent substrate 11. A roll intaglio was prepared in the following manner: an iron core was plated with chromium, and this iron core was subjected to #250 liquid sandblasting and was then plated again with chromium. Fine irregularities were thus made on the iron core surface to make the ten-point mean surface roughness Rz, specified by JIS-B-0601 (1994), 1.3 μm.

To form the light-diffusing layer 15, the aforementioned DPS was employed. First, while rotating the roll intaglio 101, at least its depressed parts 112 were filled with the following ionizing radiation curing resin liquid. The above-described transparent substrate 11 running in the direction of rotation of the roll intaglio 101 in synchronism with the rotation of the roll intaglio 101 was brought into contact with the ionizing radiation curing resin liquid. While these two were still in contact, ultraviolet light was applied to the ionizing radiation curing resin liquid from the transparent substrate 11 side by the use of two 240-W/cm ultraviolet light lamps "D Bulb 117*a*" (trademark, a curing unit manufactured by Fusion Corporation), with the transparent substrate running at a speed of 15 m/min, thereby curing the ionizing radiation curing resin. The cured ionizing radiation curing resin (cured layer 113*a*) and the transparent substrate were firmly bonded to each other while the resin was cured, and fine irregularities were made on the cured layer due to the depressed parts 112. The cured layer and the transparent substrate were separated from the roll intaglio, thereby obtaining a light-diffusing layer 15 formed on the transparent substrate 11.

Another light-diffusing layer 15 was provided also on the back surface of the transparent substrate 11 in the same manner, thereby obtaining a light diffusion film 1 of Example 1. Both surfaces of the light diffusion film 1 had irregularities whose shape was the reverse of the shape of the surface of the roll intaglio.

The ionizing radiation curing resin liquid used in Example 1 consisted of 58 parts by weight of a tri-functional urethane acrylate oligomer, 15 parts by weight of tetraethylene glycol diacrylate, 10 parts by weight of tripropylene glycol diacrylate, 10 parts by weight of hydroxypivalic acid neopentyl glycol diacrylate, 2 parts by weight of Adeka Stub LA-31 (a benzotriazole ultraviolet light absorber manufactured by ASAHI DENKA KOGYO K.K., Japan), and 5 parts by weight of Irgacure 184 (trademark, a photopolymerization initiator available from Ciba Specialty Chemicals K.K., Japan).

Example 2

A light diffusion film was obtained in the same manner as in Example 1, except that the following ionizing radiation curing resin liquid was used.

The ionizing radiation curing resin liquid used in Example 2 consisted of 59 parts by weight of a penta-functional urethane acrylate oligomer, 15 parts by weight of tetraethylene glycol diacrylate, 10 parts by weight of tripropylene glycol diacrylate, 10 parts by weight of hydroxypivalic acid neopentyl glycol diacrylate, 1 part by weight of CHIMASSORB-119FL (a hindered amine radical scavenger available from NAGASE & COMPANY, LTD., Japan), and 5 parts by weight of Irgacure 184 (trademark, a photopolymerization initiator available from Ciba Specialty Chemicals K.K., Japan).

Example 3

A light diffusion film was obtained in the same manner as in Example 1, except that the following ionizing radiation curing resin liquid was used.

The ionizing radiation curing resin liquid used in Example 3 consisted of 59.5 parts by weight of a tri-functional urethane acrylate oligomer, 15 parts by weight of tetraethylene glycol diacrylate, 10 parts by weight of tripropylene glycol diacrylate, 10 parts by weight of hydroxypivalic acid neopentyl glycol diacrylate, 0.5 parts by weight of CHIMASSORB-81 FL (a benzophenone ultraviolet light absorber available from NAGASE & COMPANY, LTD., Japan), and 5 parts by weight of Irgacure 184 (trademark, a photopolymerization initiator available from Ciba Specialty Chemicals K.K., Japan).

Example 4

A light diffusion film was obtained in the same manner as in Example 1, except that the following ionizing radiation curing resin liquid was used.

The ionizing radiation curing resin liquid used in Example 4 consisted of 59.5 parts by weight of a penta-functional urethane acrylate oligomer, 15 parts by weight of tetraethylene glycol diacrylate, 10 parts by weight of tripropylene glycol diacrylate, 10 parts by weight of hydroxypivalic acid neopentyl glycol diacrylate, 0.5 parts by weight of Zarole (a salicylate ultraviolet light absorber manufactured by API Corporation, Japan), and 5 parts by weight of Irgacure 184 (trademark, a photopolymerization initiator available from Ciba Specialty Chemicals K.K., Japan).

Comparative Example 1

A light diffusion film was obtained in the same manner as in Example 1, except that the following ionizing radiation curing resin liquid was used.

The ionizing radiation curing resin liquid used in Comparative Example 1 consisted of 60 parts by weight of a urethane acrylate oligomer, 15 parts by weight of tetraethylene glycol diacrylate, 10 parts by weight of tripropylene glycol diacrylate, 10 parts by weight of hydroxypivalic acid neopentyl glycol diacrylate, and 5 parts by weight of Irgacure 184 (trademark, a photopolymerization initiator available from Ciba Specialty Chemicals K.K., Japan).

(Method of Evaluation)

The light diffusion films were evaluated in terms of light-diffusing power, change in hue, and transparency.

The light-diffusing power was indicated by the haze value according to JIS-K7361, and the transparency was indicated by the total light transmittance.

The light-diffusing power and the transparency were determined in accordance with JIS-K-7361-1, using a haze meter HM 150 (trademark, Murakami Color Research Laboratory, Japan).

Hue $b^*$ (b star value) based on the $L^*$, $a^*$, $b^*$ color system according to JIS-Z-8729 was used to indicate a change in hue and was determined by the use of a color-luminance meter BM-7 (trademark, manufactured by Topcon Corp., Japan).

The measurement was conducted in the following manner: each one of the light diffusion films of Examples and Comparative Example was incorporated in a 21-type (21-inch) surface light source unit having a light source composed of 12 cold cathode ray tubes that were arranged in parallel, and the hue in the center portion of the surface of the surface light source unit was measured right after the incorporation of the light diffusion film to the surface light source unit and also after 5000-hour lighting of the light source; the difference between the two hue values obtained was taken as the change in hue ($b^*$). The results of the evaluation are shown in Table 1.

TABLE 1

| Item | UV Light Absorber | Change in Hue ($b^*$ value) | Total Light Transmittance (%) | Light Diffusing Power (haze %) |
|---|---|---|---|---|
| Example 1 | benzotriazole | 0.2 | 90.2 | 30.9 |
| Example 2 | hindered amine | 0.3 | 90.3 | 31.1 |
| Example 3 | benzophenone | 0.4 | 90.4 | 31.3 |
| Example 4 | salicylate | 0.3 | 90.6 | 32.1 |
| Comp. Ex. 1 | none | 2.8 | 90.5 | 34.1 |

(Results of Evaluation)

All of the light diffusion films of Examples were excellent in light-diffusing power (haze) and also in transparency, showing transmittances of as high as above 90%. The changes in hue were below 1.0, and no yellowing was visually observed. Moreover, it was confirmed that changes in color to yellow or the like due to ultraviolet light from the light source did not occur.

On the other hand, although the light diffusion film of Comparative Example was excellent in both light-diffusing power (haze) and transparency, the change in hue was found as great as 2.8, and yellowing was visually observed.

Example 5

The light diffusion film of Example 1, a light source composed of 12 cold cathode ray tubes arranged in parallel, and other conventional members were assembled into a 21-type (21-inch) surface light source unit having the construction shown in FIG. 1. The entire surface of the surface light source unit underwent no coloring, and the luminance on the surface of the surface light source unit was uniform and satisfactorily high. Even after 5000-hour lighting of the light source, any change in hue, such as yellowing, was not observed.

Example 6

The surface light source unit of Example 5 and a transmission-type liquid crystal panel were assembled into a 21-type (21-inch) TV monitor (liquid crystal display) having the construction shown in FIG. 1. The image displayed on the liquid crystal display was excellent in quality. Even after 5000-hour image displaying, no change in image quality was observed.

The invention claimed is:

1. A light diffusion film comprising:
    a transparent substrate, and
    a light-diffusing layer provided at least on one surface of the transparent substrate either directly or through another layer,
    the light-diffusing layer comprising an ionizing radiation curing resin and an ultraviolet light absorber and having, on its surface, fine irregularities that have a function of diffusing light,
    wherein
        when being incorporated in a 21-type (21-inch) surface light source unit having a direct-type surface light source member that contains, as a light source, 12 cold cathode ray tubes arranged in parallel, the light diffusion film makes the center portion of the surface of the surface light source unit show a change in hue (b*), based on the L*, a*, b* color system according to JIS-Z-8729, of not more than 2.0 as a difference between the hue values determined right after the incorporation of the light diffusion film to the surface light source unit and after 5000-hour lighting of the light source.

2. The light diffusion film according to claim 1, wherein
light-diffusing layers are provided on both surfaces of the transparent substrate,
each light-diffusing layer comprising an ionizing radiation curing resin and an ultraviolet light absorber and having, on its surface, fine irregularities that have a function of diffusing light.

3. The light diffusion film according to claim 1, wherein
the light-diffusing layer is provided at least on one surface of the transparent substrate through a primer layer.

4. The light diffusion film according to claim 1, wherein the ultraviolet light absorber is one, or two or more compounds selected from benzotriazole ultraviolet light absorbers, salicylate ultraviolet light absorbers, and benzophenone ultraviolet light absorbers.

5. The light diffusion film according to claim 4, wherein the ultraviolet light absorber further contains a hindered amine radical scavenger.

6. A surface light source unit comprising:
a direct-type surface light source member containing a plurality of light sources that are arranged in parallel and a reflector surrounding these light sources, having an opening on the light-emerging side and a light-reflecting face on its inner surface,
a light diffusion film placed on the light-emerging side of the direct-type surface light source member, and
a lens film placed on the light-emerging side of the light diffusion film,
the light diffusion film comprising:
a transparent substrate, and
a light-diffusing layer provided at least on one surface of the transparent substrate either directly or through another layer,
the light-diffusing layer comprising an ionizing radiation curing resin and an ultraviolet light absorber and having, on its surface, fine irregularities that have the function of diffusing light.

7. The surface light source unit according to claim 6, wherein
light-diffusing layers are provided on both surfaces of the transparent substrate, and each light-diffusing layer comprises an ionizing radiation curing resin and an ultraviolet light absorber and has, on its surface, fine irregularities that have a function of diffusing light.

8. The surface light source unit according to claim 6, wherein
the ultraviolet light absorber is one, or two or more compounds selected from benzotriazole ultraviolet light absorbers, salicylate ultraviolet light absorbers, and benzophenone ultraviolet light absorbers.

9. The surface light source unit according to claim 8, wherein
the ultraviolet light absorber further contains a hindered amine radical scavenger.

10. The surface light source unit according to claim 6, wherein
the light-diffusing layer is provided at least on one surface of the transparent layer through a primer layer.

11. The surface light source unit according to claim 6, wherein
the direct-type surface light source member contains, as a light source, 12 cold cathode ray tubes that are arranged in parallel,
the surface light source unit is of 21 type (21 inches), and
the center portion of the surface of the surface light source unit shows a change in hue (b*), based on the L*, a*, b* color system according to JIS-Z-8729, of not more than 2.0 as a difference between the hue values determined right after the incorporation of the light diffusion film in the surface light source unit and after 5000-hour lighting of the light source.

12. A liquid crystal display comprising:
a surface light source unit, and
a liquid crystal display panel placed on the light-emerging side of the surface light source unit,
the surface light source unit comprising:
a direct-type surface light source member containing a plurality of light sources that are arranged in parallel and a reflector surrounding these light sources, having an opening on the light-emerging side and a light-reflecting face on its inner surface,
a light diffusion film placed on the light-emerging side of the direct-type surface light source member, and
a lens film placed on the light-emerging side of the light diffusion film,
the light diffusion film comprising:
a transparent substrate, and
a light-diffusing layer provided at least on one surface of the transparent substrate either directly or through another layer,
the light-diffusing layer comprising an ionizing radiation curing resin and an ultraviolet light absorber and having, on its surface, fine irregularities that have the function of diffusing light.

* * * * *